US008159388B2

(12) United States Patent
Erkocevic-Pribic et al.

(10) Patent No.: US 8,159,388 B2
(45) Date of Patent: Apr. 17, 2012

(54) METHOD FOR FILTERING SEA CLUTTER IN A RADAR ECHO USING A HYDROGRAPHIC MODEL

(75) Inventors: Radmila Erkocevic-Pribic, Delgauw (NL); Jan Karelse, Delft (NL); Hubert Langeraar, Hengelo (NL)

(73) Assignee: Thales Nederland B.V., Hengelo (NL)

( * ) Notice: Subject to any disclaimer, the term of this patent is extended or adjusted under 35 U.S.C. 154(b) by 169 days.

(21) Appl. No.: 12/299,497

(22) PCT Filed: Apr. 26, 2007

(86) PCT No.: PCT/EP2007/054096
§ 371 (c)(1),
(2), (4) Date: Aug. 7, 2009

(87) PCT Pub. No.: WO2007/128703
PCT Pub. Date: Nov. 15, 2007

(65) Prior Publication Data
US 2009/0303109 A1    Dec. 10, 2009

(30) Foreign Application Priority Data
May 8, 2006   (NL) ..................................... 1031761

(51) Int. Cl.
*G01S 13/00*   (2006.01)
(52) U.S. Cl. ....................................................... 342/159
(58) Field of Classification Search .................... 342/159
See application file for complete search history.

(56) References Cited

U.S. PATENT DOCUMENTS

| | | | |
|---|---|---|---|
| 4,394,658 A * | 7/1983 | Short, III ......................... 342/99 |
| 4,837,579 A | 6/1989 | Pease et al. | |
| 5,546,084 A * | 8/1996 | Hindman ...................... 342/25 F |
| 5,546,085 A * | 8/1996 | Garnaat et al. ............... 342/25 A |
| 5,969,662 A * | 10/1999 | Hellsten ....................... 342/25 A |
| 6,227,135 B1 * | 5/2001 | Pedersen ................... 114/230.15 |
| 2003/0167125 A1 * | 9/2003 | Seemann et al. .................. 702/2 |

OTHER PUBLICATIONS

Greco, et al, 2006. "Non-stationarity analysis of real X-Band clutter data at different resolutions." IEEE Conference on Radar, Apr. 2006. pp. 44-50.
Root, et al, 1998. "HF Radar Ship Detection Through Clutter Cancellation." Proceedings of the 1998 IEEE Radar Conference, pp. 281-286.
Khan, R. H., 1990. "Time Domain Analysis of Ocean Clutter in High Frequency Radar." IEEE, Sep. 24, 1990. pp. 257-262.
Seeman, et al, 2000. "Hydrographic Parameter Maps Retrieved From Nautical Radar Image Sequences of Inhomogeneous Water Surfaces." IEEE Proceedings of the International Geoscience and Remote Sensing Symposium, vol. 5, pp. 1898-1900.
Wensik, H. E., 2000. "On parametric detection of small targets in sea clutter." Proceedings of the Third International Conference on Information Fusion, vol. 1, pp. MoC1-17 to MoC1-24.
Gini, et al, 2002. "Texture modelling, estimation and validation using measured sea clutter data." IEEE Proceedings on Radar, Sonar & Navigation, vol. 149, No. 3, pp. 115-124.

\* cited by examiner

*Primary Examiner* — Timothy A Brainard
(74) *Attorney, Agent, or Firm* — Stroock & Stroock & Lavan LLP

(57) ABSTRACT

There is disclosed a method for filtering sea clutter in a radar echo using a hydrographic model. The method comprises the steps of determining parameter values of the hydrographic model using the radar echo, estimating the sea clutter corresponding to the sea surface as deduced from the hydrographic model and filtering of the estimated sea clutter from the radar echo.

5 Claims, 3 Drawing Sheets

METHOD FOR FILTERING SEA CLUTTER IN A RADAR ECHO USING A HYDROGRAPHIC MODEL

Figure 1:
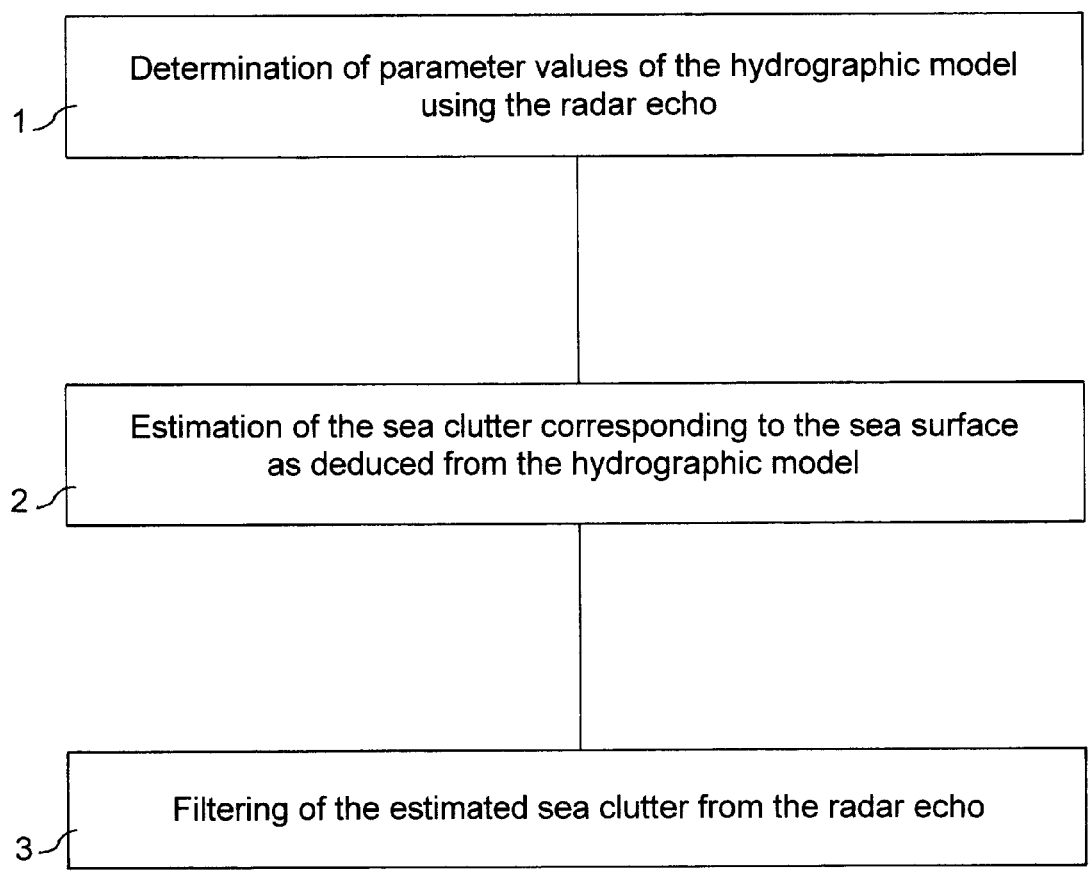

This application under 35 U.S.C. §371 is the U.S. national stage application of, and claims priority from, International Application No. PCT/EP2007/054096, filed Apr. 26, 2007, which in turn claims priority from Netherlands patent application No. 1031761 filed with the Netherlands Patent Office on May 8, 2006, both of which are incorporated herein by reference in their entirety.

The present invention relates to a method for filtering sea clutter in a radar echo, using a hydrographic model. For example, it applies to the detection of targets in a sea clutter environment.

Sea clutter is the sum of unwanted signal returns that are echoed by waves at the sea surface, when the waves are illuminated by a search radar intended to detect targets like ships or aircrafts. Detection of small surface targets in a sea clutter environment is a difficult challenge. Indeed, the amplitude of radar echoes from such targets is weak and is comparable with the amplitude of the radar echoes from sea. In addition, Doppler frequencies of targets and sea clutter often overlap. Furthermore, statistical distribution of sea clutter is difficult to predict from a stochastic point of view.

A solution based on a threshold of amplitude has been used in the past in an attempt to discriminate targets from sea clutter. However in strong sea conditions, the amplitude of sea echoes may become stronger than the amplitude of small targets echoes, which are thus no longer detected.

A solution based on Doppler frequency has also been tested in an attempt to discriminate targets from sea clutter. Unfortunately, the expected peaks of frequency associated with the steady speed of targets are often drowned in a wider bandwidth associated with the varying speed of the sea.

A stochastic approach has also been considered. This approach aimed at modeling sea clutter by measuring its statistical characteristics for later filtering of actual sea clutter. But sea clutter is a special case because of its very specific distribution and correlation laws. In particular, approximation of its statistical distribution by the well-know Rayleigh distribution resulted either in a high rate of false alarm or in a lot of targets not being detected, depending on the actual sea surface. Consequently this solution has not proved to be very reliable.

The present invention aims to provide a method which may be used to overcome at least some of the technical problems described above, by considering continuous evolution in time and scale of sea surface instead of considering separately instantaneous characteristics of individual echoes like amplitude or Doppler frequency. Indeed, sea clutter and targets can easily be mixed up based on the amplitude or Doppler of their echoes. However, sea clutter and targets cannot be mixed up based on their actual movements. At its most general, the invention proposes to combine modelling of sea clutter based on a hydrographic model with later filtering of actual clutter, the hydrographic model to be used describing precisely the evolution in time and scale of sea surface. The sea surface as modelled enables to estimate associated sea clutter. Estimated sea clutter is finally removed from the signal actually measured. After removal of the estimated sea clutter, the remaining echoes are likely to be targets.

According to its main aspect, the present invention may provide a method for filtering sea clutter in a radar echo using a hydrographic model. The method comprises a step of determination of parameter values of the hydrographic model using the radar echo. The method includes a step of estimation of the sea clutter corresponding to the sea surface as deduced from the hydrographic model. The method also comprises a step of filtering of the estimated sea clutter from the radar echo.

Preferably, the hydrographic model describes long waves only, which may be the sum of sinusoidal components. These sinusdoidal components may be described through a dispersion relation that relates their wavenumber and their wave-frequency to the wave direction, the sea depth, the sea current and the radar platform velocity. In a practical embodiment, the wave direction may be considered substantially identical to wind direction. The wavenumber-wavefrequency pairs that belong to the dispersion relation may be determined using a Fourier Transform over space and a Fourier Transform over time of the radar echo measurement. Depending on the radar measurement, the Fourier Transform over space may be a 1D Fourier transform over range or a 2D Fourier Transform over surface.

Thus, an advantage provided by the present invention in any of its embodiments is that it works from data that should already be available for other purposes in systems operating at present. For example, in the frame of the REA concept (REA stating for "Rapid Environment Assessment"), running functions do already work from hydrographic data or are alleged to capitalize on it in the near future. Moreover, to spare computation time, re-estimation of sea surface and sea clutter may be performed at quite a low rate, for example one estimation per 10 filtering, taking into consideration that sea swell does not change that much. Therefore, in many of its implementations, use of hydrographic data for filtering sea clutter may involve no major upgrading of systems operating at present, neither at a hardware level nor at a software level. This makes the invention a highly cost cutting solution. Finally, any embodiment of the invention allows a lower rate of false alarms to be observed in comparison with former threshold based methods, whatever the configuration of the sea surface, whether or not it comprises sea spikes. This makes the invention a highly reliable solution.

Figure 2:
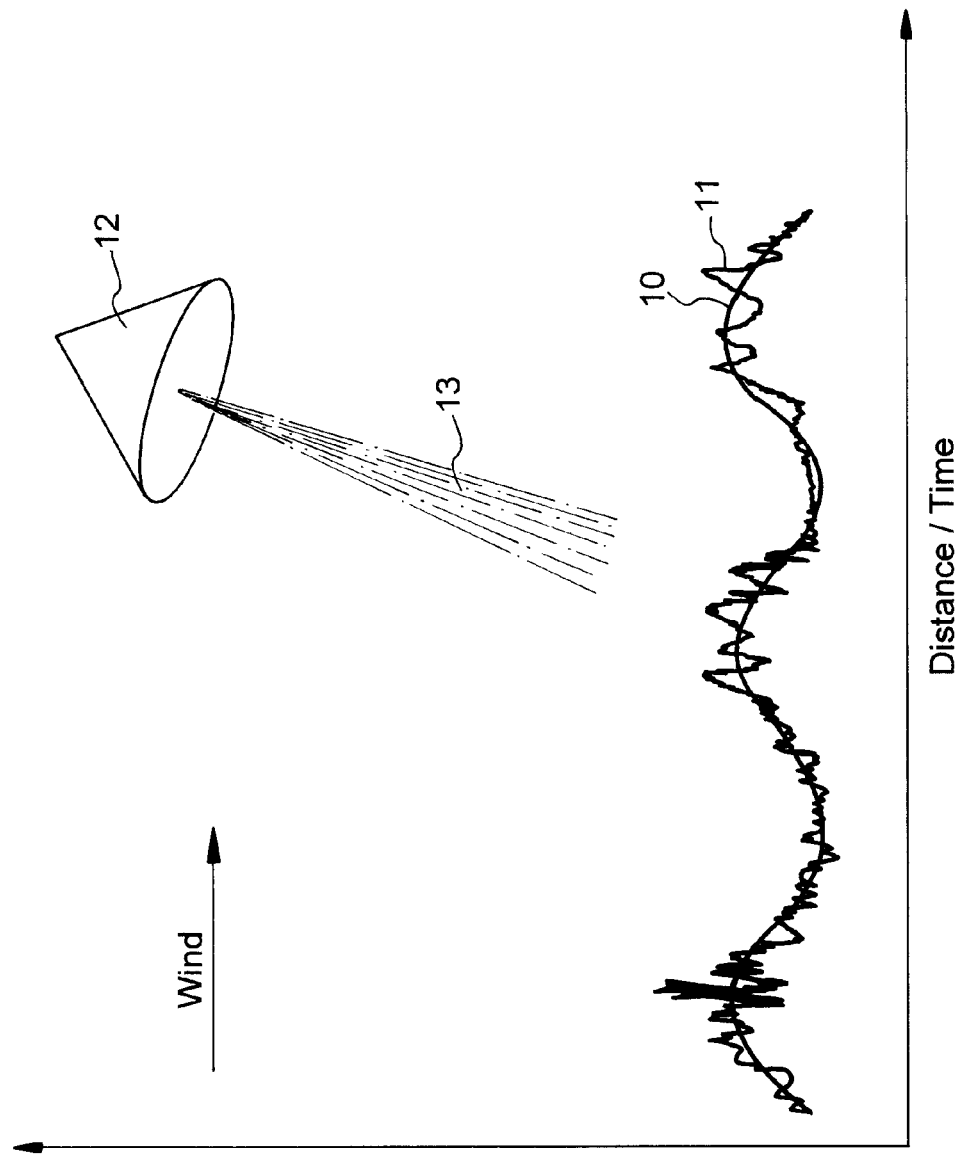
Figure 3A:
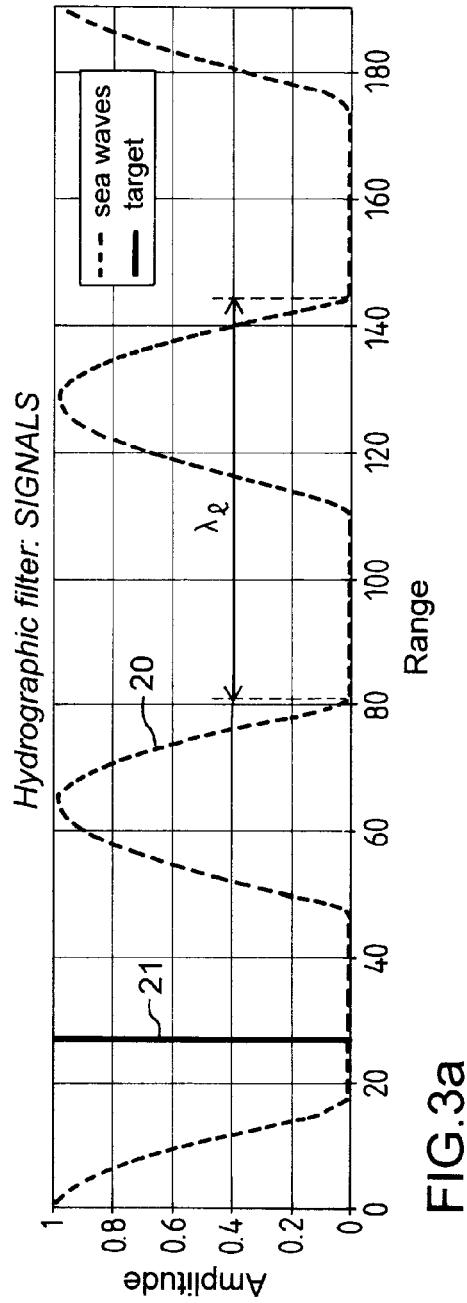
Figure 3B:
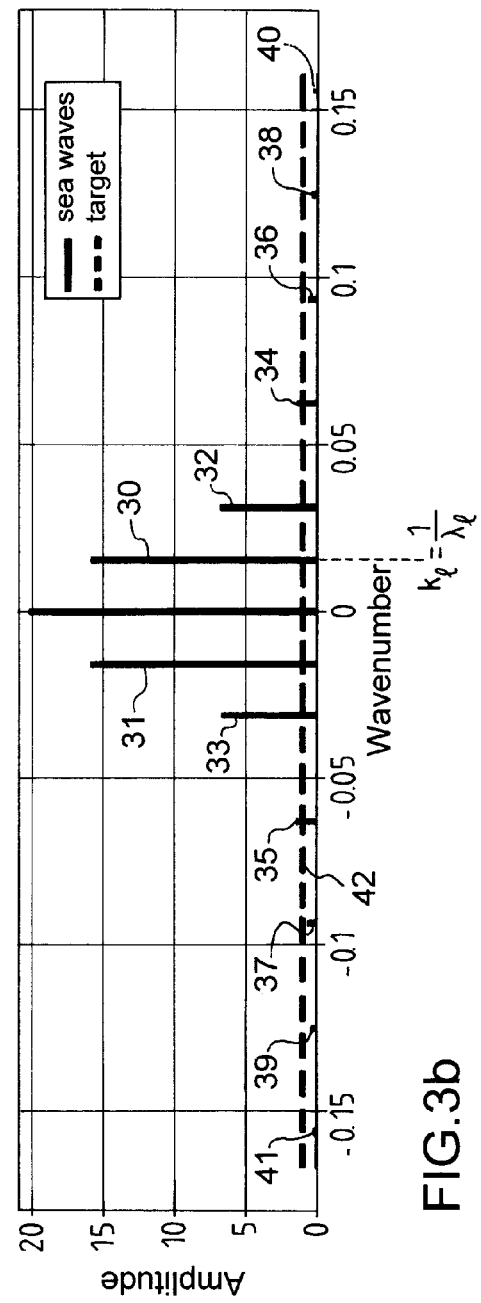

Non-limiting examples of the invention are described below with reference to the accompanying drawings in which:

FIG. 1 illustrates a possible sequence of steps as an embodiment of the invention, FIG. 2 schematically illustrates the typical shape of a wave at the sea surface, FIGS. 3a and 3b graphically illustrate the amplitude of long waves.

In the figures, like reference signs are assigned to like items.

FIG. 1 illustrates a possible sequence of steps as an embodiment of the invention.

It comprises a step 1 of determination of the hydrographic model parameter values using the radar echo.

FIG. 2 schematically illustrates the typical shape of a dominant linear wave 10 at the sea surface. Such a wave is usually called a long-scale wave, a long wave or a sea swell. This is a hypothetical or an ideal wave that does not actually exist. Indeed, FIG. 2 also schematically illustrates an actual wave 11 that is the combination of the long wave 10 with a secondary wave carried by the long wave 10. The secondary wave is usually called a short-scale wave or a short wave. It may cause sea spikes in radar echoes. Preferably, the hydrographic model that may be used describes precisely the evolution in time and scale of long waves at the sea surface. Indeed, in the present embodiment of the invention, short waves are neglected.

A radar antenna 12 emits an electromagnetic beam 13 towards the sea surface. The antenna 12 receives an echo after reflection of the beam 13 from the actual wave 11. Three components are usually recognized in an echo of a radar beam emitted towards the sea surface at a more or less acute angle, that is to say a beam that grazes the sea surface before being actually echoed.

The first component is the resonant scattering from small ripples (or short waves) riding on top of longer waves. Thus, this component contains sea swell, that is to say those longer waves as they tilt the small ripples. This component is also called the Bragg component. Physical models for sea clutter have been based on the Bragg component for many years. In the present embodiment of the invention, the hydrographic model is focused on this particular and dominant sea phenomenon only, namely the swell.

The second component is the scattering from the very rough whitecaps of broken waves and the third component is the specular scattering from the crest of a wave, just before it spills. These two components describe sea spikes that are most difficult to model. In the present embodiment of the invention, the hydrographic model overlooks this secondary sea phenomenon.

FIG. 3a and 3b graphically illustrate the assumption made in the present embodiment of the invention that the amplitude of long waves may vary as a sum of L sinusoidal functions of range and time.

FIG. 3a illustrates the assumption in the range domain. The X-axis represents a horizontal range at the sea surface in meters. The Y-axis represents the amplitude of waves, that is to say their height above sea level. A curve 20 represents the variation of height of an hypothetical wave that would be the $l^{th}$ sinusoidal component ($l \in \{1, \ldots, L\}$). The curve 20 varies according to a sinusoidal function characterized by a wavelength $\lambda_l$ of approximately 60 meters.

FIG. 3b illustrates the assumption in the wavenumber domain. The X-axis represents the wavenumber, which is the reciprocal of wavelength. The Y-axis represents the amplitude of waves. The peak 30 represents the same hypothetical wave that would be the $l^{th}$ sinusoidal component, which is represented in FIG. 3a by the curve 20. Peaks 31, 32, 33, 34, 35, 36, 37, 38, 39, 40 and 41 represent other sinusoidal components of the long waves. Assuming that the long waves are sinusoidal only, that is to say they have a small number of spectral components 31, 32, 33, 34, 35, 36, 37, 38, 39, 40 and 41 that can be easily recognized, a filter would simply be applied to isolate these components.

Similarly, waveperiod $T_l$ associated with the wave sketched by the curve 20 would be highlighted in a graph in which the X-axis would represent time and the Y-axis would represent the amplitude of waves at a fixed location. Wavenumber $k_l$ and wavefrequency $f_l$ are reciprocal values of the wavelength $\lambda_l$ and the waveperiod $T_l$, respectively.

Considering in the present embodiment of the invention that the sea current and the radar platform velocity may not be neglected, the long waves are described by those waves that obey the following dispersion relation (1), which relates wavenumber $k_l$ with wavefrequency $f_l$:

$$f_l = b_l \sqrt{k_l g \cdot \tanh(2\pi k_l D)/2\pi} + (\vec{u} + \vec{v})\vec{k_l} \quad (1)$$

Where:
$f_l$: wavefrequency,
$b_l = \cos(\phi - \theta_l)$, where $\phi - \theta_l$ represents the angle between antenna beam direction $\phi$ and the wave direction $\theta_l$ (e.g. angles of 0, $\pi/2$ and $\pi$ correspond to upwave, crosswave and downwave, respectively), $k_l$: wavenumber ($k_l = |\vec{k_l}|$),
g: gravity acceleration,
D: sea depth,
$\vec{u}$: sea current,
$\vec{v}$: radar platform velocity.

Thus, values of wave direction $\theta_l$ and of sea depth D have to be known for assessment of $k_l$ and $f_l$. The sea current $\vec{u}$ and the radar platform velocity $\vec{v}$ are also needed but if they are not available, they can be easily estimated because they are linear parameters in the model. Preferably, the wave direction $\theta_l$ may be considered as identical to the wind direction $\theta_{wind}$. Indeed, sea swell is created by wind-caused moving of sea surface that is later balanced by the gravity force. It is worth noting that the wave direction $\theta_l$ and the wind direction $\theta_{wind}$ are not always identical, as the wind may change while the waves maintain direction of some previous wind.

As a consequence, a radar echo $s_\phi(r,t)$ at time t, distance r and azimuth $\phi$ should be investigated in the wavenumber-wavefrequency domain to estimate the wavenumber-wavefrequency pairs ($k_l, f_l$), which is achievable using well-known Fourier Transform in two or three dimensions. Based on staring radar data (2D), i.e. from measurements of the radar echo in range and time with constant azimuth, a 1D Fourier transform over range followed by a 1D Fourier Transform over time can be performed. Based on scanning radar data (3D), i.e. from measurements of the radar echo in range, azimuth and time, a 2D Fourier transform over surface followed by a 1D Fourier Transform over time can be performed. Whether radar echo $s_\phi(r,t)$ contains swell only or swell together with targets, swell peaks clearly appear at pairs ($k_l, f_l$) that belong to the dispersion relation (1).

The sequence of steps also comprises a step 2 of estimation of the sea clutter corresponding to the sea surface as deduced from the hydrographic model.

The expected long waves are computed from the sea behaviour, for example from sea parameters such as wind/wave direction and sea depth, which must be measurable before the present embodiment of the invention can be applied. In the case where the radar platform velocity is not considered as negligible, the sea behaviour may also be corrected by the ship motion, which should include heading, pitch and roll.

The radar signal in the wavenumber-wavefrequency domain is compared with the expected swell. This comparison reveals the sea clutter that may belong to the expected swell. The result contains a number of dominant long waves each described by its estimated wavenumber and wavefrequency, later called the swell parameters, and optionally also by its estimated amplitude and phase.

An extreme case can also occur where no swell in the radar measurements can be recognized.

The sequence of steps also comprises a step 3 of filtering of the estimated sea clutter from the radar echo.

As soon as the swell parameters are known, the incoming radar measurements in the initial time-range-azimuth domain can be filtered by substracting the estimated dominant swell components. For example, filtering can be performed in the original polar grid whose origin is the radar. Alternatively, filtering can also be performed in a rectangular grid.

A target is represented by a peak 21 in FIG. 3a and by a constant curve 42 in FIG. 3b. As sketched in FIG. 3b, the target echo should be weak because the sea waves dominate its spectral content. The target could also be slow, i.e. its Doppler velocities can be within the sea clutter Doppler spectrum. For example, FIGS. 3a and 3b may correspond to a scenario combining strong sea, say sea state larger than 3, with a small and possibly slow target. This is one of the most difficult scenarios encountered in radar operation, and currently not solved yet.

The hydrographic assumption, stating that amplitude of long waves varies as a sum of sinusoidal functions of range, holds only for the particular sea behaviour. Moreover the long waves are quite significant among all sea-related phenomena. Therefore only the target echoes remain available after the hydrographic filtering. The hydrographic filter appears to be an effective sea clutter filter.

In the extreme case when no long waves have been recognized, no hydrographic filter can be applied.

It is to be understood that variations to the examples described herein, such as would be apparent to the skilled addressee, may be made without departing from the scope of the present invention.

A key advantage of the method according to the invention is that it works in difficult radar scenarios combining strong sea with weak and slow targets, which is not yet solved in existing radars.

The invention claimed is:

1. A method implemented in a radar system for filtering sea clutter from an echo issued from the radar system on board a moving platform resulting in the surveillance of targets using a hydrographic model describing long waves, comprising the following steps:

determining parameter values of the hydrographic model using radar echo from the radar system;

estimating sea clutter corresponding to a sea surface as deduced from the hydrographic model to produce an estimated sea clutter; and filtering the estimated sea clutter from the radar echo, wherein the hydrographic model describes long waves only, and wherein the long waves are a sum of sinusoidal components, the sinusoidal components of long waves being described through a dispersion relation that relates a wavenumber and a wavefrequency to a wave direction, a sea depth, a sea current and a radar platform velocity.

2. The method according to claim 1, wherein the wave direction is substantially identical to a wind direction.

3. The method according to claim 1, wherein the wavenumber and the wavefrequency that belong to the dispersion relation are determined using a Fourier Transform over space and a Fourier Transform over time of a radar echo measurement.

4. The method according to claim 3, wherein the Fourier Transform over space is a 1D Fourier transform over range, the radar echo being measured in range and time with constant azimuth.

5. The method according to claim 3, wherein the Fourier Transform over space is a 2D Fourier Transform over surface, the radar echo being measured in range, azimuth and time.

* * * * *